United States Patent [19]
Castillo

[11] Patent Number: 5,280,989
[45] Date of Patent: Jan. 25, 1994

[54] STATIC CLING VINYL HALTER TYPE COVER FOR VEHICLE FRONT PROTECTION

[76] Inventor: Rodolfo H. Castillo, 1660 N. Prospect Ave. #605, Milwaukee, Wis. 53202

[21] Appl. No.: 898,572

[22] Filed: Jun. 15, 1992

[51] Int. Cl.⁵ .............................................. B60R 27/00
[52] U.S. Cl. ..................................... 296/136; 280/770
[58] Field of Search ................. 296/136, 97.7; 280/770

[56] References Cited

U.S. PATENT DOCUMENTS

| | | | |
|---|---|---|---|
| 3,642,567 | 2/1972 | Rogers | 296/136 X |
| 4,749,222 | 6/1988 | Idland | 296/97.7 X |
| 4,953,909 | 9/1990 | Crane | 296/136 |
| 5,002,326 | 3/1991 | Westfield | 296/95.1 |
| 5,050,925 | 9/1991 | Brown | 296/136 |
| 5,127,974 | 7/1992 | Tomiyama et al. | 296/136 X |

FOREIGN PATENT DOCUMENTS

| | | | |
|---|---|---|---|
| 2755263 | 6/1979 | Fed. Rep. of Germany | 296/136 |
| 3807667 | 9/1989 | Fed. Rep. of Germany | 296/136 |
| 3832770 | 11/1989 | Fed. Rep. of Germany | 296/97.7 |
| 1-82179 | 7/1989 | Japan | 296/136 |
| 671373 | 8/1989 | Switzerland | 296/97.7 |

*Primary Examiner*—Russell D. Stormer
*Assistant Examiner*—Gary C. Hoge

[57] ABSTRACT

An improved halter type protective cover is constructed out of static cling vinyl cut to fit over the front part of the hood and front fenders of a car to protect the finish from dirt, bug stains, road grime, tar, flying particles, stones and similar damaging material. It is fastened to the front end by means of the electrostatic properties of the material and without the use of adhesives.

2 Claims, 3 Drawing Sheets

STATIC CLING VINYL HALTER TYPE COVER FOR VEHICLE FRONT PROTECTION

BACKGROUND FIELD OF INVENTION

This invention relates to the protection of a vehicle finished by the use of a soft P.V.C. foil that clings to a smooth and glossy surface by the static electricity of the chemical composition of the material.

BACKGROUND DESCRIPTION OF PRIOR ART

In the past, cars have been protected by acrylic shields made out of different material such as acrylic compounds and heavy weather proof black vinyl that is cut to fit the contour of the car's front end (U.S. Pat. No. 4,219,218 to Waldon 1980). This product protects the front end of the car but fails in the aesthetic factor because it is clearly visible due to the fact that the materials used in their manufacturing are grey or black. Also these products are constructed to fasten to the vents in the top of the hood and by means of novel spring clamps to the edges of the front fender and bumper of the car.

This problem has been solved by the implementation of a soft calendered P.V.C. foil static cling vinyl, that offers the same protection as the black vinyl with the advantage of being a soft clear material and not requiring the use of clamps or hinges.

This is due to the electrostatic properties of the material when it adheres itself to the non pourous surface of the car.

SUMMARY

It is, therefore an object of the present invention to provide a car finish protective device which will fulfill the need lacking in the prior art.

It is a further object of the present invention to provide protection to the car finish which may be quickly and conveniently applied or removed from the outer surface of an automobile front end.

The foregoing and related objects are accomplished by the implementation of a soft calendered P.V.C. foil static cling vinyl that protects the front end of the car's finish. The non permanent bonding is accomplished by the electrostatic properties of the material.

The soft calendered P.V.C. foil static cling vinyl is preferably PENSTICK #4305 CLEAR (a registered trademark of MOLCO INC. and N.V. MOLCO S.A. GERMANY) It will be appreciated, however, that various other flexible, durable and transparent material with same chemical properties may also be used in the claimed combination of the present invention. Thus the use of PENSTICK #4305 CLEAR, however is the preferred material.

Among the advantages provided by the present invention is that the static cling vinyl halter system herein disclosed incorporates the high impact resistance properties of the material in order to deflect airborne rocks, debris, dirt, etc., thereby preserving the finish of the automobile.

It should, of course, be recognized that, as appropriate as desired by the owner of an automobile, the inventive static cling vinyl halter system of the present invention may be employed on any other area of automobile, such as side and rear of the vehicle in order to protect the same from damage.

To the accomplishment of the above and related objects, the present invention may be embodied in the form illustrated in the accompanying drawing figures, attention being called to the fact, however, that the drawing figures are intended to be illustrative only, and that changes may be made in the specific construction illustrated and described within the scope of the claims.

OBJECTS AND ADVANTAGES

Therefore, several advantages of my invention are:
It protects the delicate surface of the car finish without the use of the thick black vinyl or hard acrylic shield.
It attaches itself to the smooth surface of the car by static electricity and it has been tested to withstand high speeds without flapping in the wind.
It allows the sun to get to the paint so the paint fades at the same rate.
It doesn't have to be removed when wet like prior bra halter cover do.

Further advantages of my invention will become apparent after viewing the drawings and ensuing description.

BRIEF DESCRIPTION OF THE DRAWING FIGURES

DETAILED DESCRIPTION OF THE PREFERRED EMBODIMENTS

Figure 1:
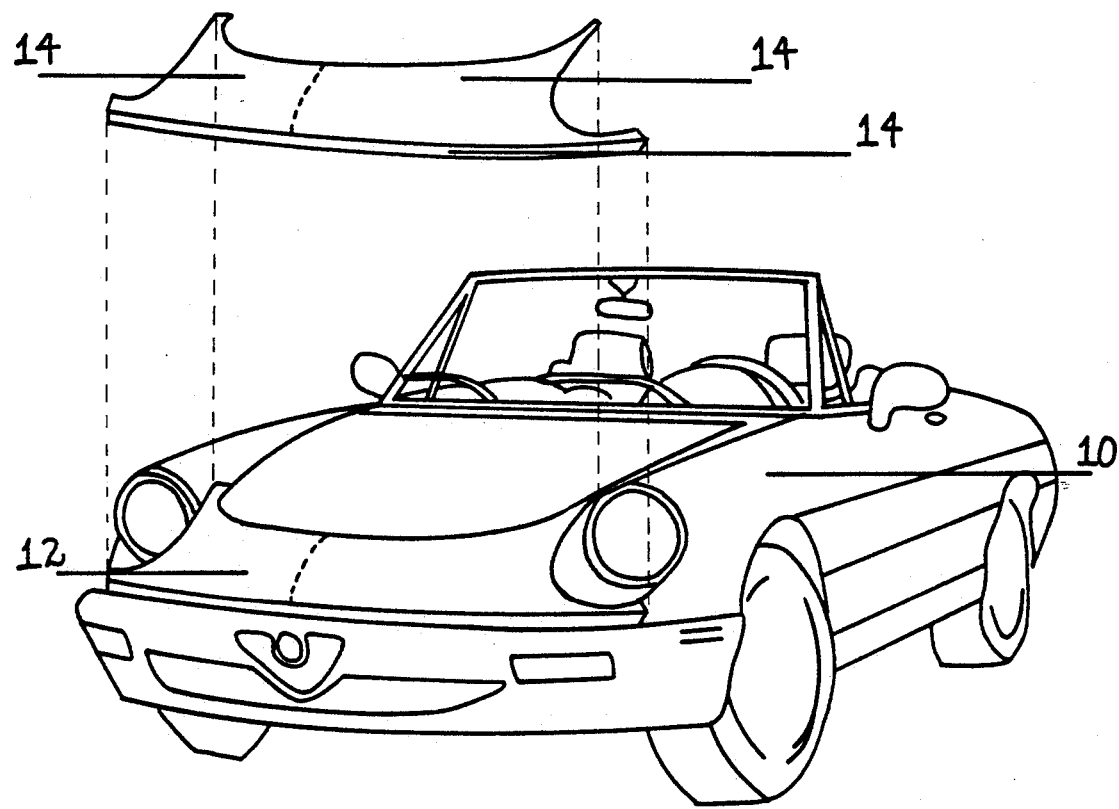
FIG. 1 Shows a front view of the vehicle and the halter type cover raised and also in position.
Figure 3:
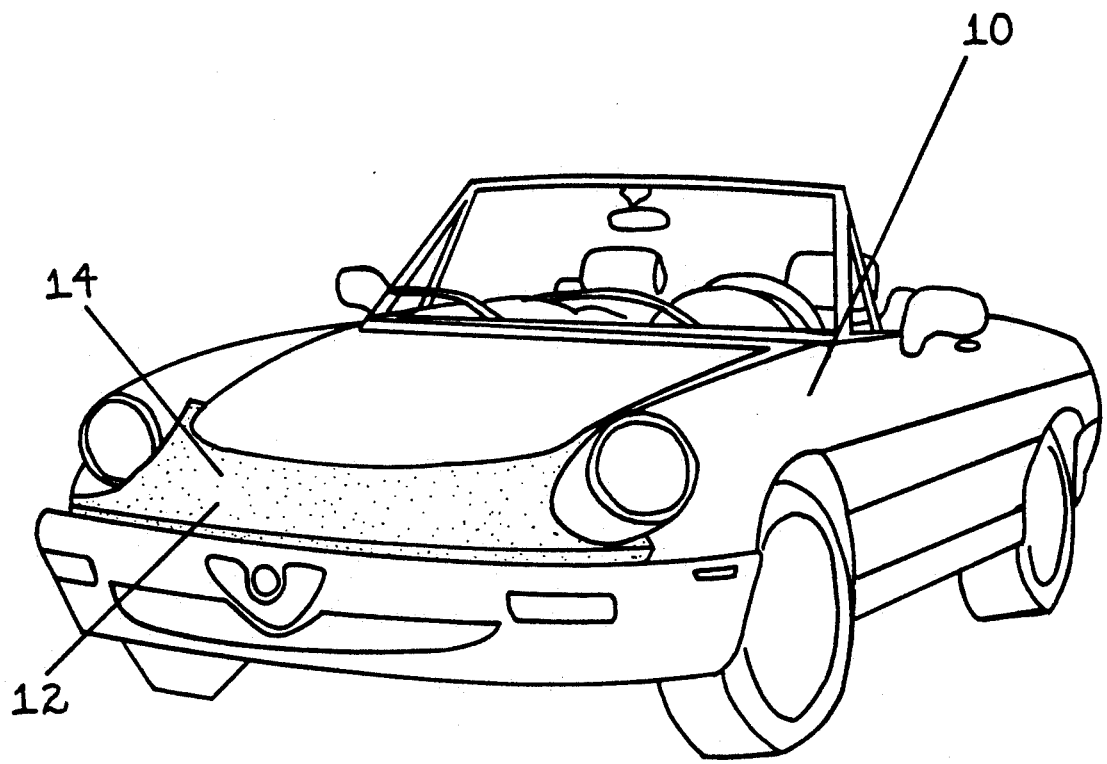
FIG. 3 Shows a front view of a car showing the halter type cover in position.

Turning now in detail, to an analysis of the accompanying drawing figures, FIGS. 1 and 3 show an automobile 10 having a front end 12.

Removably affixed upon the front end 12 is the protective cover, or static cling vinyl halter system 14 of the present invention with its three members for the vehicle shown.

The static cling vinyl halter system 14 is composed of at least one sheet of flexible vinyl cut to a predetermined shape and is preferably removably affixed to the front end 12 via the floating method described below.

Although the static cling vinyl halter system 14 is shown attached to the front end 12, it can be attached to any exterior body panel.

Figure 2:
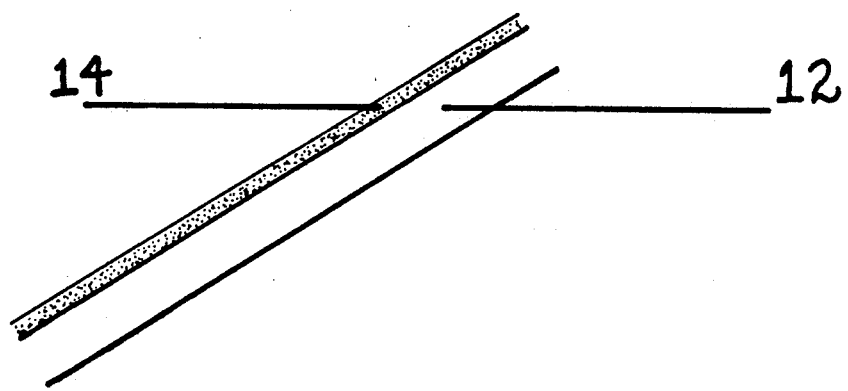
FIG. 2 Shows a side view of the interaction of the metal with the static cling vinyl.

As best shown in FIGS. 1,2 and 3, the static cling vinyl halter system 14 is a single layer protective system as shown in FIG. 2.

The protective system will be made out of three parts that will vary depending on the model of the car. Normally two pieces will be over the hood and one piece over the fender thus covering the area where damage is more apt to occur in the front end 12.

The form of application will be the floating method:
1. Clean carefully the application surface from dust and grime (12).
2. Wet the application surface with a spray bottle (12).
3. Tear off the backing paper and smooth the vinyl into the desired position before water dries (12,14).
4. Remove any air bubbles and the excess water by applying pressure with a soft blade squeegee beginning at the bottom edge.

5. Resqueegee the vinyl with firm overlapping strokes from the bottom edge towards each edge to ensure airthigh bond.
6. Dry entire area with a clean cloth.
7. The vinyl halter (14) can be easily removed and reused if its surface is still clean and free of dust or residues, when the halter is in position the car has to be wash by hand or at a no touch car wash.

Suitable holes or appertures are provided for headlights and side lights, and when in position, the cover will not detract. In fact, it allows the true design and features of the car to show through the halter cover. Thus, there is no interference with the aesthetic statement of the car. Once installed on the car, it is quite stable when the car is moving at high speeds and readily removable when desired.

Although the description above contains many specificities, those should not construed as limiting the scope of the invention but as merely providing illustrations of the presently preferred embodiments of this invention.

I claim:

1. A protective cover for protecting an exterior body panel of an automobile, said cover comprising:
   a flexible sheet cut to a predetermined shape; said sheet conforming to and being adhered to said exterior body panel by non-adhesive, non-mechanical means; said sheet remaining adhered to said exterior body panel when said vehicle is in motion and when said vehicle is at rest.

2. The protective cover of claim 1, wherein the sheet is adhered by an electrostatic force between the sheet and the exterior body panel.

* * * * *